US011036815B2

(12) United States Patent
Yokote

(10) Patent No.: US 11,036,815 B2
(45) Date of Patent: Jun. 15, 2021

(54) DISTRIBUTION METHOD AND SYSTEM FOR CONTENT

(71) Applicant: Ken-ichi Yokote, Tokyo (JP)

(72) Inventor: Ken-ichi Yokote, Tokyo (JP)

( * ) Notice: Subject to any disclaimer, the term of this patent is extended or adjusted under 35 U.S.C. 154(b) by 139 days.

(21) Appl. No.: 16/309,928

(22) PCT Filed: Jul. 10, 2016

(86) PCT No.: PCT/JP2016/070352
§ 371 (c)(1),
(2) Date: Dec. 14, 2018

(87) PCT Pub. No.: WO2018/011836
PCT Pub. Date: Jan. 18, 2018

(65) Prior Publication Data
US 2019/0332635 A1 Oct. 31, 2019

(51) Int. Cl.
*G06F 16/9535* (2019.01)
*G06F 16/906* (2019.01)
(Continued)

(52) U.S. Cl.
CPC ........ *G06F 16/9535* (2019.01); *G06F 3/0482* (2013.01); *G06F 16/235* (2019.01); *G06F 16/2455* (2019.01); *G06F 16/906* (2019.01)

(58) Field of Classification Search
CPC .............. G06F 16/9535; G06F 16/906; G06F 16/2455; G06F 16/235; G06F 3/0482
See application file for complete search history.

(56) References Cited

U.S. PATENT DOCUMENTS

| 9,760,556 | B1* | 9/2017 | Knudson | G06F 40/169 |
| 2006/0069714 | A1* | 3/2006 | Blount | G06Q 10/10 |
| | | | | 709/203 |
| 2016/0283585 | A1* | 9/2016 | Zheng | G06F 16/345 |

FOREIGN PATENT DOCUMENTS

| JP | H09-167164 A | 6/1997 |
| JP | 2002-140356 A | 5/2002 |
| JP | 2015-197905 A | 11/2015 |

OTHER PUBLICATIONS

International Search Report for PCT/JP2016/070352 dated Aug. 9, 2016.

(Continued)

*Primary Examiner* — Jay A Morrison
(74) *Attorney, Agent, or Firm* — Yokoi & Co., U.S.A.; Toshiyuki Yokoi

(57) ABSTRACT

To provide content group distribution method and system that allow a content group distribution that improves a convenience of an action to consume a content group widely and shallowly by a user, and further, improves an efficiency as well. A fragment DB 12 has attribute information indicative of what sort of purpose information of a fragment meets. A profile information DB 21 has degree-of-demand information indicative of what sort of attribute information a content demanded by a consumer has. A fragment generating unit 70 configures each content surely from "a plurality of fragments and one main body." A content generating unit 51 generates a content fragment group while calculating a priority using the fragment DB 12 and the profile information DB 21. A user interface generating unit 50 generates a user interface for choosing an additional consumption of the fragment group for the fragment group.

3 Claims, 15 Drawing Sheets

(51) Int. Cl.
*G06F 3/0482* (2013.01)
*G06F 16/2455* (2019.01)
*G06F 16/23* (2019.01)

(56) References Cited

OTHER PUBLICATIONS

PCT written opinion dated Aug. 9, 2016.
Japanese notice of the reason for refusal dated Jun. 24, 2014.
Japanese notice of the reason for refusal dated Dec. 9, 2014.

* cited by examiner

FIG. 3

| Item | Main Body Information 1 | Main Body Information 2 | ... |
|---|---|---|---|
| Content ID | 1 | 2 | ... |
| Category | Economy | Entertainment | ... |
| Registration Date | 20140104 | 20140102 | ... |
| Registrant | Crawler A | XX Newspaper Company | ... |
| Creation Date | 20140103 | 20140101 | ... |
| Creator | YY Newspaper Company | XX Newspaper Company | ... |
| Main Body Contents | In QQ Market ... | In press conference, ZZ ... | ... |
| ... | ... | ... | ... |

FIG. 4

| Item | Fragment Information 1 | Fragment Information 2 | ... |
|---|---|---|---|
| Fragment ID | 1 | 2 | ... |
| Corresponding Content ID | 10 | 20 | ... |
| Registration Date | 20140201 | 20140301 | ... |
| Registrant | Crawler B | Fragment Generating Unit | ... |
| Creation Date | 20140101 | 20140201 | ... |
| Creator | XX Newspaper Company | Fragment Generating Unit | ... |
| Fragment Contents | Phantom killer in ZZ | Crash of stock in QQ | ... |
| Conclusion Attribute Value | 2 | 1 | ... |
| Theme Attribute Value | 1 | 2 | ... |
| Location Attribute Value | 1 | 0 | ... |
| Time Attribute Value | 0 | 0 | ... |
| ... | ... | ... | ... |

FIG. 5

| Item | Profile Information 1 | Profile Information 2 | ... |
|---|---|---|---|
| Profile ID | 1 | 2 | ... |
| Corresponding Consumer ID | 10 | 30 | ... |
| Corresponding Category | Entertainment | Economy | ... |
| Registration Date | 20140101 | 20140102 | ... |
| Last Update Date | 20140103 | 20140104 | ... |
| Degree of Demand for Conclusion | 4 | 1 | ... |
| Degree of Demand for Theme | 5 | 8 | ... |
| Degree of Demand for Location | 6 | 2 | ... |
| Degree of Demand for Time | 7 | 3 | ... |
| ... | ... | ... | ... |

*FIG. 6*

| Item | Consumer Information 1 | Consumer Information 2 | ... |
|---|---|---|---|
| Consumer ID | 1 | 2 | ... |
| Registration Date | 20140101 | 20140101 | ... |
| Last Update Date | 20140201 | 20140301 | ... |
| Authentication ID | xxx | yyy | ... |
| Authentication Password | zzzzzz | qqqqqq | ... |
| Account Name | Hayashi | Takahashi | ... |
| ... | ... | ... | ... |

FIG. 7

| Item | Consumption History Information 1 | Consumption History Information 2 | ... |
|---|---|---|---|
| Consumption History ID | 1 | 2 | ... |
| Registration Date | 20140101 | 20140101 | ... |
| Corresponding Consumer ID | 10 | 20 | ... |
| Consumption Type | Fragment | Main Body | ... |
| Corresponding Fragment ID | 40 | 50 | ... |
| Corresponding Content ID | 10 | 20 | ... |
| Corresponding Category | Entertainment | Economy | ... |
| ... | ... | ... | ... |

DISTRIBUTION METHOD AND SYSTEM FOR CONTENT

TECHNICAL FIELD

The present invention relates to a method for distributing information. Especially, the present invention relates to a method that aggregates and distributes a large amount of information.

BACKGROUND ART

A typical method as a distribution method of a content group is a method that first provides a fragment group after configuring content from a set of a main body and fragments, and then, causes a user to choose whether he/she consumes the main body corresponding to each of the fragments.

However, "content" in this description means digital data including one or more pieces of text data, and zero or more pieces of image data, voice data, and moving image data. In one preferred embodiment of the present invention, "content" is source code data for a web page that carries a news article.

To "consume" the content means, for example, an action to see the content when it is an image, an action to read the content when it is a text, and an action to listen the content when it is a sound. In one preferred embodiment of the present invention, to "consume" the content is an action to browse the above-described web page on a web browser.

"Main body" means all of parts desired to be consumed by the user in the content. In one preferred embodiment of the present invention, "main body" means the above-described source code data.

"Fragment" means content including a part of the main body or fragmentally including the information of the main body. In one preferred embodiment of the present invention, "fragment" means, for example, source code data that holds a title of the above-described news article.

This distribution method is employed in most of Internet services that aggregate and distribute a large amount of content groups. For example, in a search result screen of a search engine service, the titles (=fragments) of the web pages are listed to cause the user to choose whether he/she accesses the corresponding link destination page (=main body) for each, in many cases. When a news distribution service distributes a news article group, headlines (=fragments) of news items are listed to cause the user to choose whether he/she reads the news body text (=main body) for each, in many cases.

DISCLOSURE OF THE INVENTION

Problems to be Solved by the Invention

A typical method as the distribution method for the above-described content group causes the user to choose between the two: "to consume only the fragment" and "to consume up to the main body" for each content. However, the consumption method is not limited to this. The user sometimes desires to consume the whole content group with an amount more than the provided fragment and less than the main body.

In this description, an action "to consume" the whole content group "with an amount more than the provided fragment and less than the main body" is referred to as "to consume widely and shallowly."

For example, the search engine service generates a demand to the action to consume the whole content group widely and shallowly from an incentive that the user cannot determine whether the link destination page (=main body) is the information he/she wants only by the title (=fragment), and wants to determine which link destination page he/she browses again after reading the first few lines in each link destination page. Actually, an action to find the information the user wants while repeating a work to browse the link destination page of each title output by the search engine little and remove is considerably general. The news distribution service also generates the demand to the action to consume the whole content group widely and shallowly from an incentive that the user wants to acquire the information more than the provided list (=fragment group) of the headlines, and wants to roughly grasp what happened at that day rather than want to completely know a specific news item.

In the typical method as the distribution method for the content group, when the user wants to consume the whole content group widely and shallowly, an action to choose "to consume up to the main body" for each content, and then, "to consume only a part of the main body and stop the consumption there" will be repeated.

First, this action requires multiple manipulations by the user in many cases, thus having a poor convenience. It is preferable that a content distributor side explicitly provide an option "to consume the whole widely and shallowly" other than the two options: "to consume only the fragment" and "to consume up to the main body."

An additional provision of this option: "to consume the whole widely and shallowly" is not performed by leading search engine services and leading news distribution services. Therefore, it is considered that this corresponds to not an addition of well-known and commonly used means, but an improvement having the inventive step.

Further, at this time, note that even if any part in the main body is consumed, its efficiency does not become uniform.

In this description, "efficiency" of the consumption means a level of achievement of a consumption purpose with respect to a consumption quantity. For example, when the purpose to consume a certain news item for a certain user is to know a conclusion of the news item, a consumption efficiency when reading a conclusion paragraph is higher than that when reading a background paragraph, even though the respective paragraphs are equally one paragraph.

An efficiency of the action to consume the whole content group widely and shallowly is affected by the purpose of the user, and which part in the main body is consumed.

Accordingly, it is preferable that the content distributor appropriately guide the user to a part that should be consumed in consideration of the purpose and the desire of the user.

Solutions to the Problems

The present invention provides the following solutions.

(1) A distribution method for a content group with computer software, including:

a step of generating content fragments from each content of the content group;

a step of generating a content fragment group;

a step of generating a user interface for choosing a consumption of a corresponding main body for each fragment of the fragment group;

a step of generating a user interface for choosing an additional consumption of the fragment group for the fragment group;

a step of combining the two user interfaces with the fragment group; and a step of responding to a choice made in the combined product to additionally generate a new fragment group or to generate a corresponding main body, wherein the "step of generating content fragments from each content of the content group" has a feature that allows one content to hold three or more fragments, further, the "step of combining the two user interfaces with the fragment group" and the "step of responding to a choice made in the combined product to additionally generate a new fragment group or to generate a corresponding main body" allow a user to repeat an action to consume the content group widely and shallowly two or more times by combining the new fragment group with the two user interfaces again and with the feature, further, the two user interfaces limit a count of options of the consumption to one more than a total count of the content.

According to such a configuration, this content distribution method first generates the fragments from the content to establish the fragment group. Then, this content distribution method generates the user interfaces that explicitly provide the user with the option of "consumption of a corresponding main body" for each fragment of the fragment group, and further, the option of "additional consumption of the fragment group" for the fragment group. Then, this content distribution method combines this fragment group with these user interfaces to distribute it to the user. Then, when "consumption of a main body" is chosen, this content distribution method distributes the corresponding main body. Then, when "additional consumption" is chosen, this content distribution method establishes the fragment group again, and combines the fragment group with these user interfaces to distribute it to the user again. This redistribution is repeated until there are no more choices of the additional consumption from the user, or there are no more fragments that can be distributed.

In this way, the action to consume the whole content group widely and shallowly can be performed with one manipulation, and can be performed arbitrary number of times. Further, since the count of options of the consumption that can be taken each time is appropriately limited, the content group distribution method that ensures the content group distribution that improves the convenience of the action to consume the content group widely and shallowly by the user can be provided.

(2) The distribution method for the content group according to claim 1, further including a step of storing profile information regarding a content consumption per user, wherein the step of generating a content fragment group and the step of additionally generating a new fragment group are executed using the profile information.

In this description, "profile information regarding a content consumption" means "information regarding to what extent the fragment that can achieve what sort of purpose is desired to be consumed for what sort of content."

According to such a configuration, this content group distribution method can appropriately guide the user to a part that should be consumed in consideration of the purpose and the desire of the user, for the action to consume the whole content group widely and shallowly by the user. Accordingly, the content group distribution method that ensures the content group distribution that improves the efficiency of the action to consume the content group widely and shallowly by the user can be provided.

(3) The distribution method for the content group according to claim 2, wherein the step of storing profile information determines and updates the information based on a past content consumption history.

According to such a configuration, this content group distribution method can automatically obtain the above-described profile information without an explicit designation from the user, and can provide the content group distribution method that ensures the content group distribution that improves the convenience of the action to consume the content group widely and shallowly by the user.

(4) A content group distribution system including a content group distribution device that distributes a content group to a terminal via a communication network, the content group distribution system including:

fragment generating means that generates content fragments from each content of the content group;

fragment group generating means that generates a content fragment group;

user interface generating means that generates a user interface for choosing a consumption of a corresponding main body for each fragment of the fragment group;

user interface generating means that generates a user interface for choosing an additional consumption of the fragment group for the fragment group;

combining means that combines the two user interfaces with the fragment group; and responding means that responds to a choice made in the combined product to additionally generate a new fragment group or to generate a corresponding main body, wherein the "fragment generating means that generates content fragments from each content of the content group" has a feature that allows one content to hold three or more fragments, further, the "combining means that combines the two user interfaces with the fragment group" and the "responding means that responds to a choice made in the combined product to additionally generate a new fragment group or to generate a corresponding main body" allow a user to repeat an action to consume the content group widely and shallowly two or more times by combining the new fragment group with the two user interfaces again and with the feature, and further, the two user interfaces limit a count of options of the consumption to one more than a total count of the content.

With such a configuration, an effect similar to that of (1) can be expected by achieving this system.

Effects of the Invention

The present invention can provide the content group distribution method and system that ensure the content group distribution that improves the convenience of the action to consume the content group widely and shallowly by the user, and further improves the efficiency as well.

In the following, the effect will be specifically shown in numerical values. For example, it is assumed that, when N pieces of news items are distributed in the news distribution service, a consumer wants to roughly grasp what happened at that day rather than want to completely know a specific news item. Therefore, it is assumed that the consumer wants to browse each news body text only by three lines. When this action is performed in an existing content group providing method, in order to move from the headline to the body text, a manipulation (for example, clicking a link text with a computer mouse) is required each time. Thus, an order of the required manipulations is N. On the one hand, in the case of the present invention, when three lines in each news body text are surely generated in the step of "additionally generating a new fragment group," the use of "user interface for choosing an additional consumption of the fragment group" ensures acquisition of "list of three lines in the respective news body texts" with the manipulation of order one. Also when the consumer is tempted to further consume the fragment group after consuming this new fragment group, a required manipulated variable is reduced to order one in similar method.

It is assumed that the consumer wants to know especially the conclusion of the news item. At this time, assuming that a general probability that the conclusion of the news item is described in certain three lines in the news body text is 20 percent, the efficiency of the action to browse only three lines in each news body text in the existing content group providing method is also 20 percent. On the other hand, in the present invention, surely generating three lines holding the conclusion of each news item in the step of "additionally generating a new fragment group" can achieve the efficiency of 100 percent.

BRIEF DESCRIPTION OF THE DRAWINGS

FIG. 3 is a diagram illustrating an exemplary configuration of data in a main body DB.

FIG. 4 is a diagram illustrating an exemplary configuration of data in a fragment DB.

FIG. 5 is a diagram illustrating an exemplary configuration of data in a profile information DB.

FIG. 6 is a diagram illustrating an exemplary configuration of data in a consumer DB.

FIG. 7 is a diagram illustrating an exemplary configuration of data in a consumption history DB.

BEST MODE FOR CARRYING OUT THE INVENTION

The following describes an embodiment of the present invention in accordance with the drawings.

Figure 1:
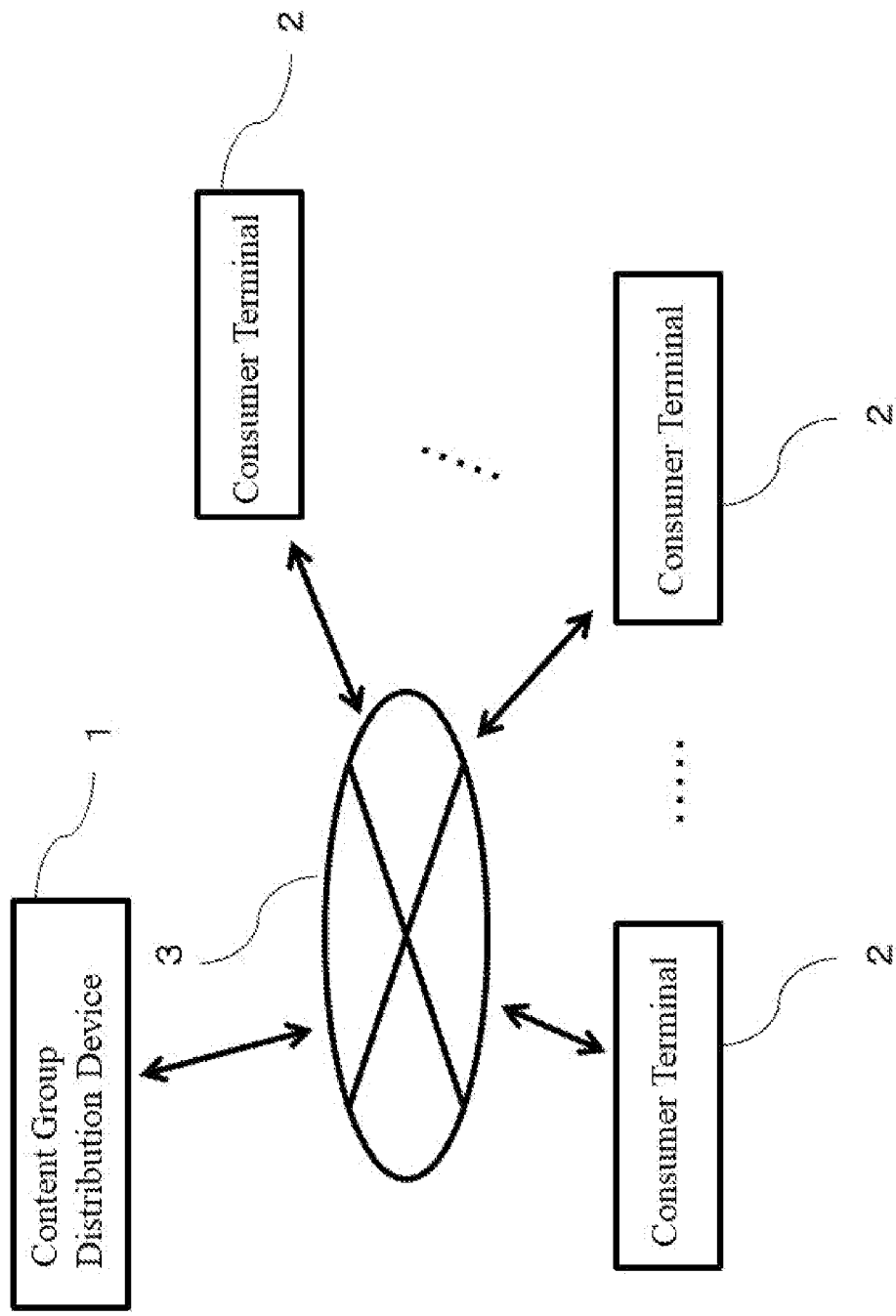
FIG. 1 is a block diagram of a whole content group distribution system according to the embodiment.

FIG. 1 is a block diagram illustrating an overall configuration of a content group distribution system including a content group distribution device 1 according to the embodiment. In this content group distribution system, the content group distribution device 1 managed by a content group provider and one or more consumer terminals 2 used by consumers to consume a content group are coupled one another via a network 3 such as the Internet. The consumer terminal 2 is a personal computer or a mobile phone having software (for example, a web browser) with which a website can be browsed.

Figure 2:
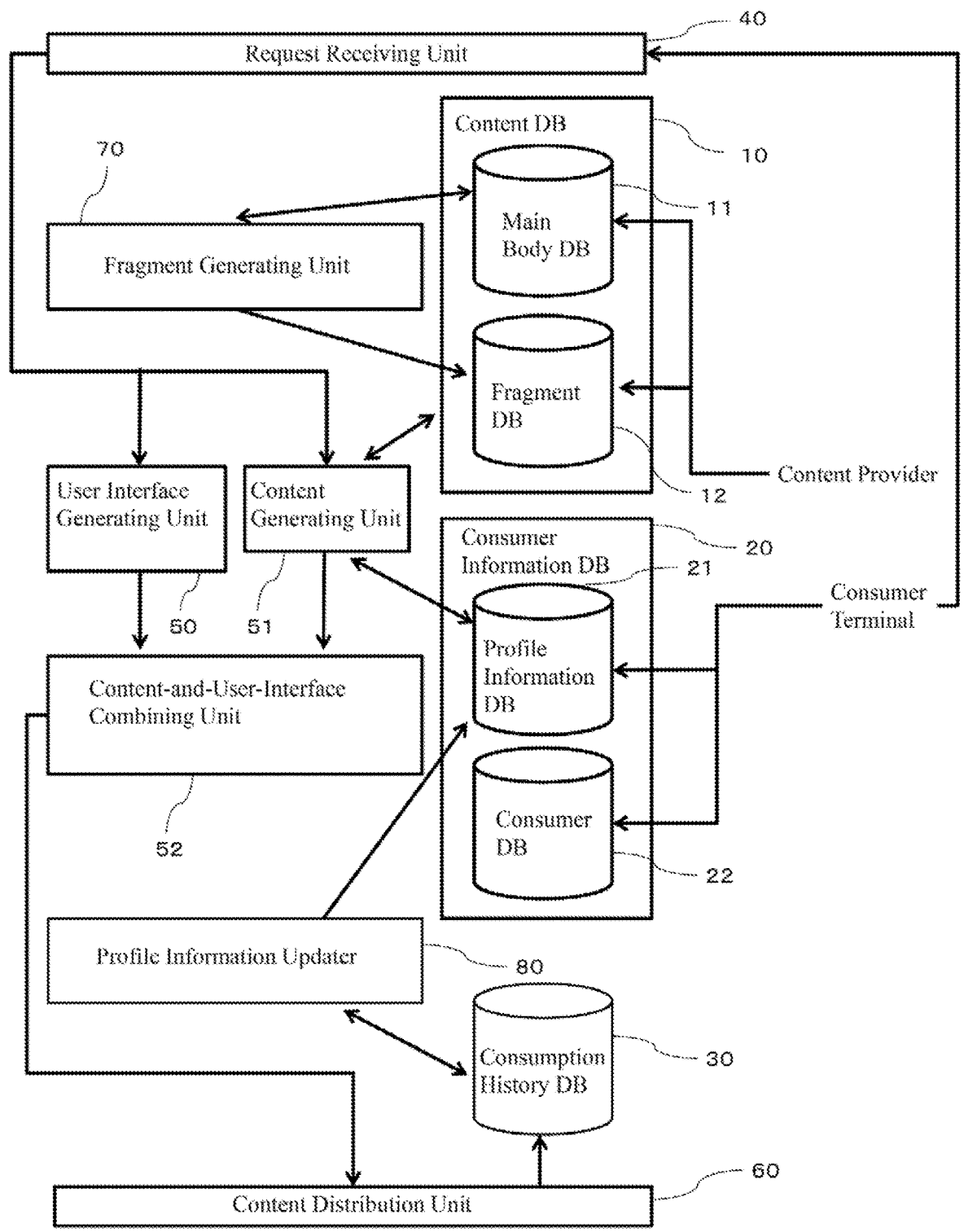
FIG. 2 is a block diagram illustrating a function composition of a content group distribution device.

FIG. 2 is a block diagram illustrating a function composition of the content group distribution device 1. This device is one that receives a request of content distribution, generates a user interface and content to combines them, and then, distributes a combined product to the consumer terminal 2.

In the embodiment, the content provider first requests content group distribution. Then, the consumer can also make a request through the user interface combined with the provided content.

In FIG. 2, the content group distribution device 1 includes a content DB 10, a consumer information DB 20, a consumption history DB 30, a request receiving unit 40, a user interface generating unit 50, a content generating unit 51, a content-and-user-interface combining unit 52, a content distribution unit 60, a fragment generating unit 70, and a profile information updater 80.

The content DB 10 acquires and stores the content distributed to the consumer. In the embodiment, the content is data of a web page. This DB 10 includes a main body DB 11 that stores a main body of the content, and a fragment DB 12 that stores a content fragment. Detailed configurations of the respective data will be described later with reference to FIGS. 3 and 4.

For the information of the content DB 10, there are a method that the content provider manually supplies it via the user interface, and a method to automatically supply it using a website crawling technique. An already-publicly-known technique may be used for the website crawling technique.

Further, the information of the fragment DB 12 is generated and supplied also by the fragment generating unit 70. The fragment generating unit 70 will be described later.

The consumer information DB 20 acquires and stores information regarding the content consumer. This DB includes a consumer DB 22 and a profile information DB 21. Detailed configurations of the respective data will be described later with reference to FIGS. 5 and 6.

The information of the consumer information DB 20 is manually supplied by the consumer via the user interface.

Further, the information of the profile information DB 21 is updated also by the profile information updater 80. The profile information updater 80 will be described later.

The consumption history DB 30 stores history information of consumption behavior of the content consumer. A configuration of the data will be described later with reference to FIG. 7.

The information of the consumption history DB 30 is generated and supplied by the content distribution unit 60. The content distribution unit 60 will be described later.

The request receiving unit 40 receives a requirement from the consumer, generates a requirement to the user interface generating unit 50 and the content generating unit 51 based on its contents, and transmits the requirement to both.

The user interface generating unit 50 receives the requirement from the request receiving unit 40, and generates a user interface based on its contents. Then, the user interface generating unit 50 transmits this user interface to the content-and-user-interface combining unit 52.

The content generating unit 51 receives the requirement from the request receiving unit 40, and generates content using the content DB 10 based on contents of the requirement from the request receiving unit 40 and contents of the profile information DB 21. Then, the content generating unit 51 transmits this content to the content-and-user-interface combining unit 52.

The content-and-user-interface combining unit 52 combines the user interface from the user interface generating unit 50 with the content from the content generating unit 51 to make it one piece of data, and then, transmits it to the content distribution unit 60.

The content distribution unit 60 receives the data from the content-and-user-interface combining unit 52 to distribute it to the consumer. Then, the content distribution unit 60 generates consumption history information regarding the distributed information to supply it to the consumption history DB 30.

The fragment generating unit 70 generates a fragment from the main body information of the main body DB 11 to supply it to the fragment DB 12.

For the supply of the information of the content DB 12, there are the above-described "method that the content provider manually supplies it via the user interface," and the above-described "method to automatically supply it using a website crawling technique." In order to achieve the step of "additionally generating a new fragment group" of the present invention, a plurality of fragments must be associated with one main body. However, in the above-described method, the content is not necessarily limited to be supplied with this configuration.

Therefore, the fragment generating unit 70 plays a role in additionally generating and supplying the fragment for the content. In this way, the content surely includes "a plurality of fragments and one main body," thus ensuring a response to the step of "additionally generating a new fragment group" of the present invention.

The profile information updater 80 generates profile information using the information of the consumption history DB 30 to update the information of the profile information DB 21.

For the supply of the information of the profile information DB 21, there is the above-described "method that the consumer manually supplies it via the user interface." However, the profile information updater 80 automatically learning the desire of the consumer from the consumption history and updating values ensures reduction in a burden of the consumer.

In the embodiment, the content group distribution device 1 having the above-described configuration is achieved by a general computer. The above-described respective units 10 to 80 are achieved such that programs corresponding to the respective functions are executed by computer hardware resources such as a CPU, a ROM, a RAM, and a hard disk drive. For example, the content generating unit 51 is achieved such that a content generating program according to the embodiment stored in a storage medium is executed by the CPU. However, an implementation of the content group distribution device 1 is not specifically limited.

The following describes the configurations of the data stored in the DBs 11, 12, 21, 22, and 30.

FIG. 3 is a diagram illustrating an exemplary configuration of the data stored in the DB 11. As illustrated in FIG. 3, the data of the DB 11 includes one or more "Main Body Information" records. Then, the "Main Body Information" record includes a plurality of fields such as "Content ID," "Category," "Registration Date," "Registrant," "Creation Date," "Creator," and "Main Body Contents."

The field "Content ID" holds identification information for uniquely identifying the main body information. The field "Category" holds a genre to which the content belongs (for example, "Sport," "Entertainment," and "Crime"). The field "Registration Date" holds year, month, and day when a registration work in the DB 11 of the main body information has been performed.

The field "Registrant" holds information for identifying, for example, whether the registration work in the DB 11 of the main body information has been performed by the website crawling technique or manually performed by the content provider. The field "Creation Date" holds year, month, and day when the main body information has been created. The field "Creator" holds information regarding a creator of the main body information. The field "Main Body Contents" holds main body data as contents of the main body information. In the embodiment, the main body data is source code text data.

FIG. 4 is a diagram illustrating an exemplary configuration of the data stored in the DB 12. As illustrated in FIG. 4, the data of the DB 12 includes one or more "Fragment Information" records. Then, the "Fragment Information" record includes a plurality of fields such as "Fragment ID," "Corresponding Content ID," "Registration Date," "Registrant," "Creation Date," "Creator," "Fragment Contents," "Priority," "Conclusion Attribute Value," "Theme Attribute Value," "Location Attribute Value," and "Time Attribute Value."

The field "Fragment ID" holds identification information for uniquely identifying fragment information. The field "Corresponding Content ID" holds a content ID to which the fragment belongs. A plurality of fragments belong to one content. The field "Registration Date" holds year, month, and day when a registration work in the DB 12 of the fragment information has been performed. The field "Registrant" holds information for identifying, for example, whether the registration work in the DB 12 of the fragment information has been performed by the website crawling technique, manually performed by the content provider, or performed by the fragment generating unit 70.

The field "Creation Date" holds year, month, and day when the fragment information has been created. The field "Creator" holds information for identifying, for example, whether a creation work of the fragment has been manually performed by a content creator himself/herself or performed by the fragment generating unit 70. The field "Fragment Contents" holds fragment data as contents of the fragment. In the embodiment, the fragment data is source code text data.

The fields "Conclusion Attribute Value," "Theme Attribute Value," "Location Attribute Value," and "Time Attribute Value" hold attribute information regarding what sort of purpose of the consumer the information of the fragment meets. For example, when certain fragment data of a certain crime news article includes information regarding where the crime happened, a high value is registered in the "Location Attribute Value" field in this the fragment information record. When information regarding what sort of damage occurred as a result of the crime is acquired, a high value is registered in "Conclusion Attribute Value." Similarly, when a type of the happened crime is acquired, a high value is registered in "Theme Attribute Value." When the date and time when the crime happened is acquired, a high value is registered in "Time Attribute Value." However, types and total number of the attribution fields are not specifically limited.

FIG. 5 is a diagram illustrating an exemplary configuration of the data stored in the DB 21. As illustrated in FIG. 5, the data of the DB 21 includes one or more "Profile Information" records. Then, the "Profile Information" record includes a plurality of fields such as "Profile ID," "Corresponding Consumer ID," "Corresponding Category," "Registration Date," "Last Update Date," "Degree of Demand for Conclusion," "Degree of Demand for Theme," "Degree of Demand for Location," and "Degree of Demand for Time."

The field "Profile ID" holds identification information for uniquely identifying each profile information. The field "Corresponding Consumer ID" holds a consumer to which the profile information belongs. One consumer has a plurality pieces of profile information. The field "Corresponding Category" holds a category to which the profile information belongs. The profile information can be uniquely identified by a set of "Corresponding Consumer ID" and "Corresponding Category," besides this "Profiles ID."

The field "Registration Date" holds year, month, and day when the registration work in the DB 21 of the profile information has been performed. The field "Last Update Date" holds year, month, and day when an update work in the DB 21 of the profile information has been last performed. The field "Degree of Demand for Conclusion," "Degree of Demand for Theme," "Degree of Demand for Location," and "Degree of Demand for Time" hold information regarding what sort of attribution the information demanded by a certain consumer has for a certain category.

FIG. 6 is a diagram illustrating an exemplary configuration of the data stored in the DB 22. As illustrated in FIG. 6, the data of the DB 22 includes one or more "Consumer Information" records. Then, the "Consumer Information" record includes a plurality of fields such as "Consumer ID," "Registration Date," "Last Update Date," "Authentication ID," "Authentication Password," and "Account Name."

The field "Consumer ID" holds identification information for uniquely identifying consumer information. The field "Registration Date" holds year, month, and day when the registration work in the DB 22 of the consumer information has been performed. The field "Last Update Date" holds year, month, and day when the update work in the DB 22 of the consumer information has been last performed.

The field "Authentication ID" holds an ID for authenticating the consumer. The field "Authentication Password" holds a password for authenticating the consumer. The field "Account Name" holds a name of the consumer.

FIG. 7 is a diagram illustrating an exemplary configuration of the data stored in the DB 30. As illustrated in FIG. 7, the data of the DB 30 includes one or more "Consumption History Information" records. Then, the "Consumption History Information" record includes a plurality of fields such as "Consumption History ID," "Registration Date," "Corresponding Consumer ID," "Consumption Type," "Corresponding Fragment ID," "Corresponding Content ID," and "Corresponding Category."

The field "Consumption History ID" holds identification information for uniquely identifying the consumption history information. The field "Registration Date" holds year, month, and day when the registration work in the DB 30 of the consumption history information has been performed. The field "Corresponding Consumer ID" holds a consumer to which the consumption history information belongs.

The field "Consumption Type" holds information regarding whether the consumed content is the main body or the fragment. The field "Corresponding Fragment ID" holds an ID of the consumed content when it is a fragment. The field "Corresponding Content ID" holds a content ID of the consumed content. The field "Corresponding Category" holds a category to which the consumed content belongs.

The following describes an operation of the content group distribution device 1 having the above-described configuration.

[Whole of Content Group Distribution Processing]

Here, a flow of the whole of content group distribution processing will be briefly described.

Figure 8:
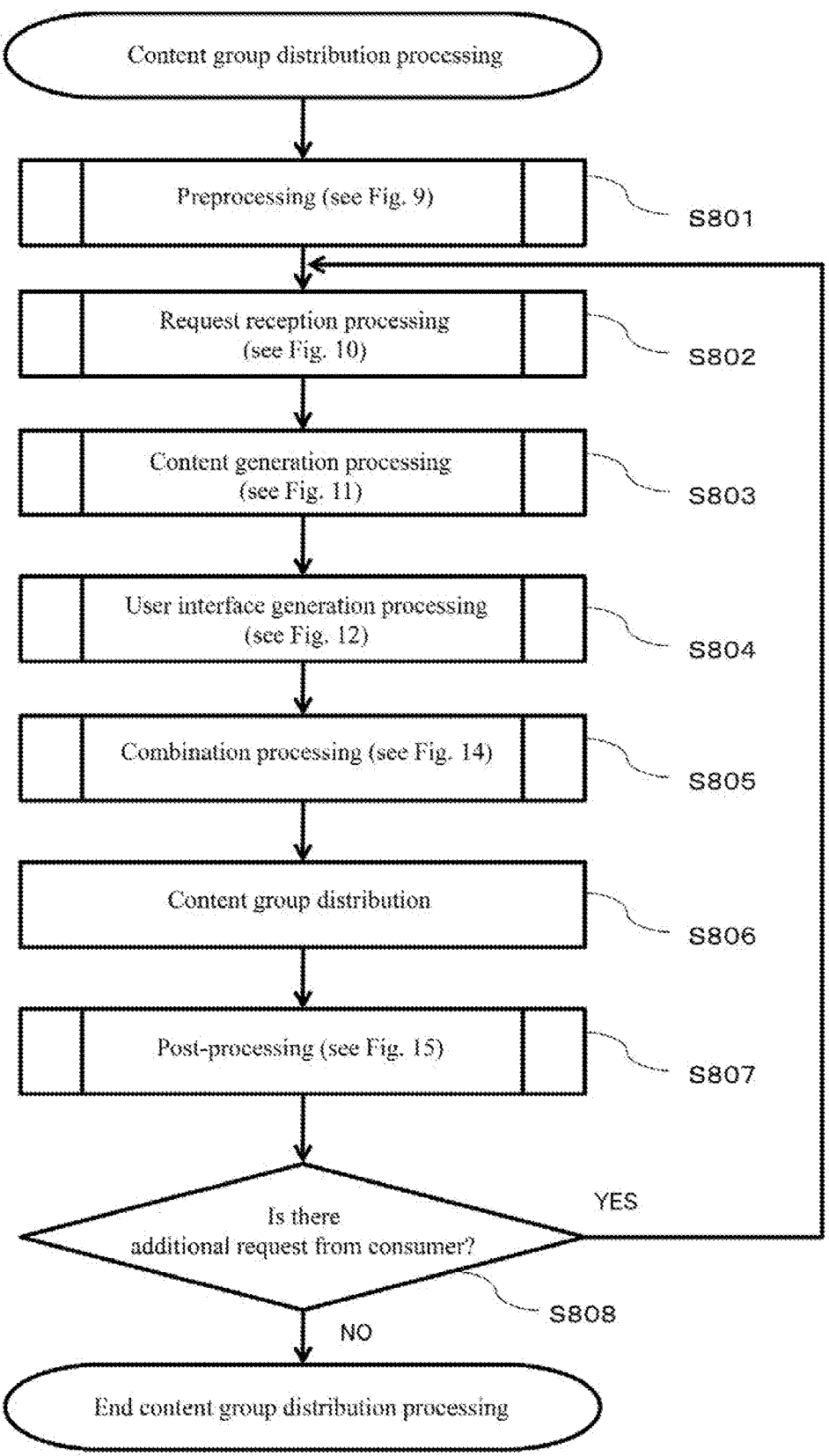
FIG. 8 is a flowchart illustrating an operating procedure of the content group distribution device.

FIG. 8 is a flowchart illustrating an operating procedure of the content group distribution processing. The content group distribution device 1 first executes preprocessing at the point when the supply of the content from the content provider has been completed (S801). Next, the content group distribution device 1 receives the request from the consumer (S802), and then, generates the content to be distributed (S803). Next, the content group distribution device 1 generates the user interface (S804), and then, combines this content with the user interface (S805). Next, the content group distribution device 1 distributes the combined content (S806), and then, executes post-processing (S807). When there is an additional request from the consumer (S808: YES), the process returns to Step 802. When there is no additional request from the consumer (S808: NO), the process is ended.

[Preprocessing]

Figure 9:
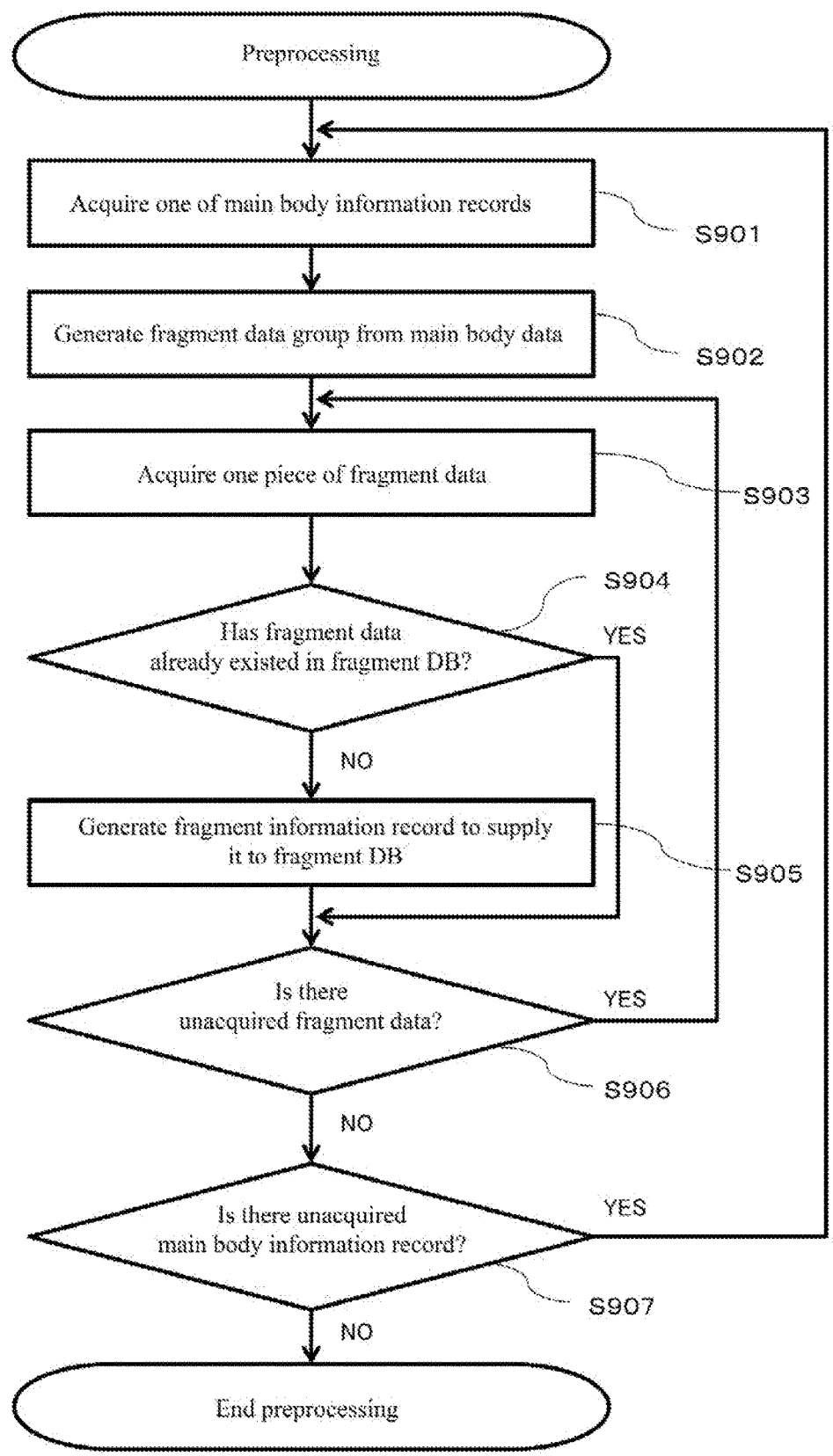
FIG. 9 is a flowchart illustrating an operating procedure of a fragment generating unit.

FIG. 9 is a flowchart illustrating an operating procedure of the process at Step 801 in FIG. 8. This process is executed by the fragment generating unit 70. A purpose of the preprocessing is to surely configure each content from "a plurality of fragments and one main body" to make it correspond to the step of "additionally generating a new fragment group" of the present invention.

The fragment generating unit 70 first acquires one of the "Main Body Information" records from the main body DB 11 (S901). Next, the fragment generating unit 70 generates all generable fragment data from the data of the "Main Body Contents" field in this main body information record (S902).

Next, the fragment generating unit 70 acquires one piece of fragment data from this fragment data group (S903). Next, the fragment generating unit 70 searches whether the fragment DB 12 includes a "Fragment Information" record that has this fragment data in the "Fragment Contents" field and has "Content ID" of this main body information record in the "Corresponding Content ID" field. When there is no "Fragment Information" record (S904: NO), the fragment generating unit 70 generates the "Fragment Information" record using this fragment data to supply it to the fragment DB 12 (S905). When there is the "Fragment Information" record (S904: YES), the process transitions to Step 906, which is described later.

Next, the fragment generating unit 70 confirms whether there is unacquired fragment data at Step 906. When there is the unacquired fragment data (S906: YES), the process returns to Step 903. When there is no unacquired fragment data (S906: NO), the process transitions to Step 907, which is described later. Next, the fragment generating unit 70 confirms whether there is an unacquired main body information record at Step 907. When there is the unacquired main body information record (S907: YES), the process returns to Step 901. When there is no unacquired main body information record (S907: NO), the process is ended.

As the process at Step 902 in FIG. 9, there is a method to randomly divide the main body data.

However, a specific procedure to generate the fragment data is not limited to this. A higher level of already-publiclyknown technique (for example, a document summary technique and a key sentence extraction technique) may be used.

In the process at Step 905 in FIG. 9, as determination of the fields "Conclusion Attribute Value," "Theme Attribute Value," "Location Attribute Value," and "Time Attribute Value" in the "Fragment Information" record, there is a method to preliminarily prepare a dictionary that associates words with the attribute value to take its sum. For example, when there is fragment data "Outbreak of fire on Mount Fuji," and a dictionary that associates a location attribute value 1 with "Mount Fuji" and a theme attribute value 1 with "fire" has been prepared, this data can generate a "Fragment Information" record with "Conclusion Attribute Value" of 0, "Theme Attribute Value" of 1, "Location Attribute Value" of 1, and "Time Attribute Value" of 0.

However, a specific procedure to calculate the attribute value is not limited to this.

A higher level of already-publicly-known technique (for example, a named entity extraction and an implication recognition technique) may be used.

[Request Reception Processing]

Figure 10:
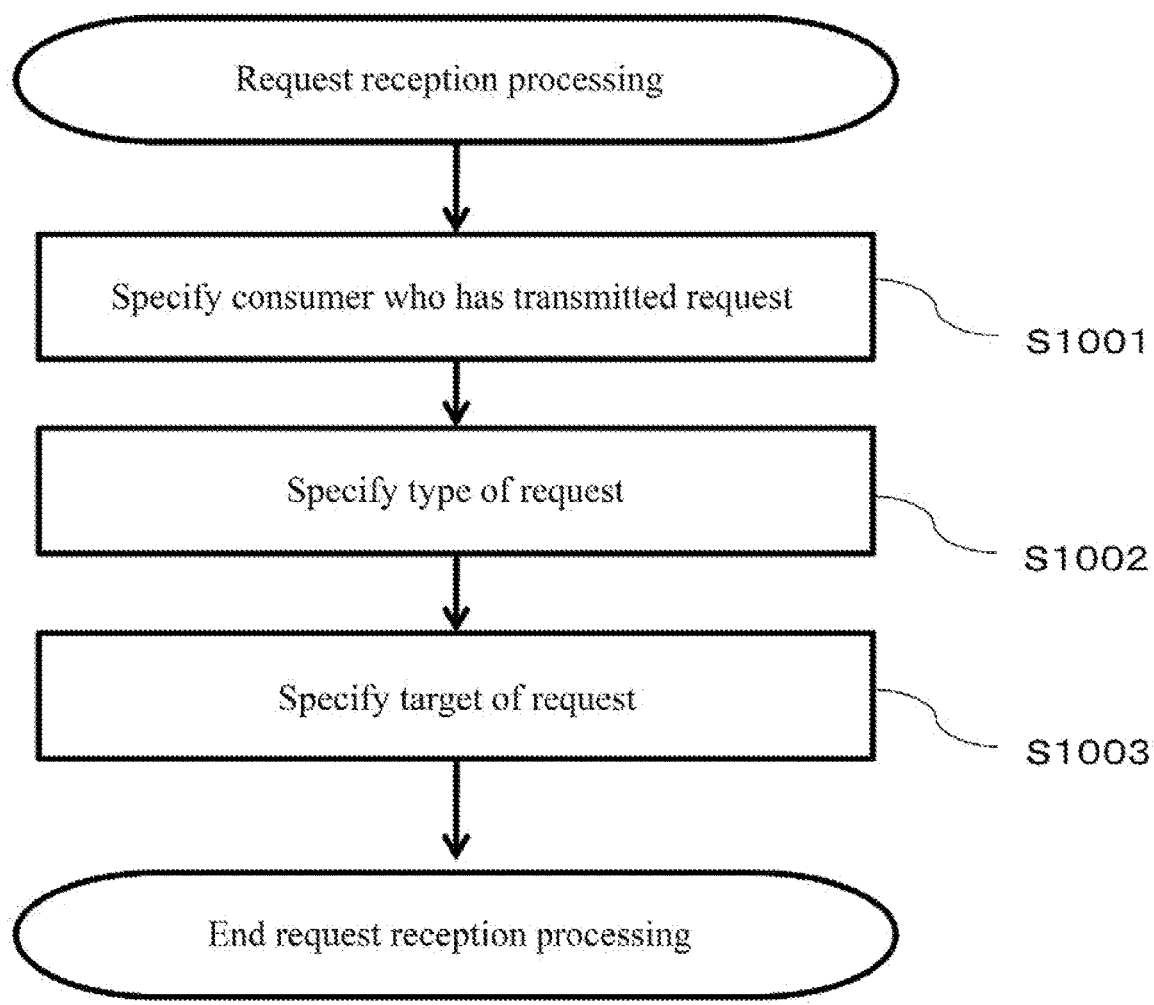
FIG. 10 is a flowchart illustrating an operating procedure of a reception processing unit.

FIG. 10 is a flowchart illustrating an operating procedure of the process at Step 802 in FIG. 8. This process is performed by the reception processing unit 40.

The reception processing unit 40 first checks the ID and the password using the consumer DB 22 based on the received request to specify consumer ID information A of a request transmitter (S1001). Next, the reception processing unit 40 specifies type information B of the request (S1002), and then, specifies target information C of the request (S1003).

Here, B holds information that ensures identification whether the type of the request is "Initial Consumption Requirement of Fragment Group," "Consumption Requirement of Main Body," or "Additional Consumption Requirement of Fragment Group." C holds no value when B is "Initial Consumption Requirement of Fragment Group." C holds the target content ID when B is "Consumption Requirement of Main Body." C holds a list of the target content IDs when B is "Additional Consumption Requirement of Fragment Group."

[Content Generation Processing]

Figure 11:
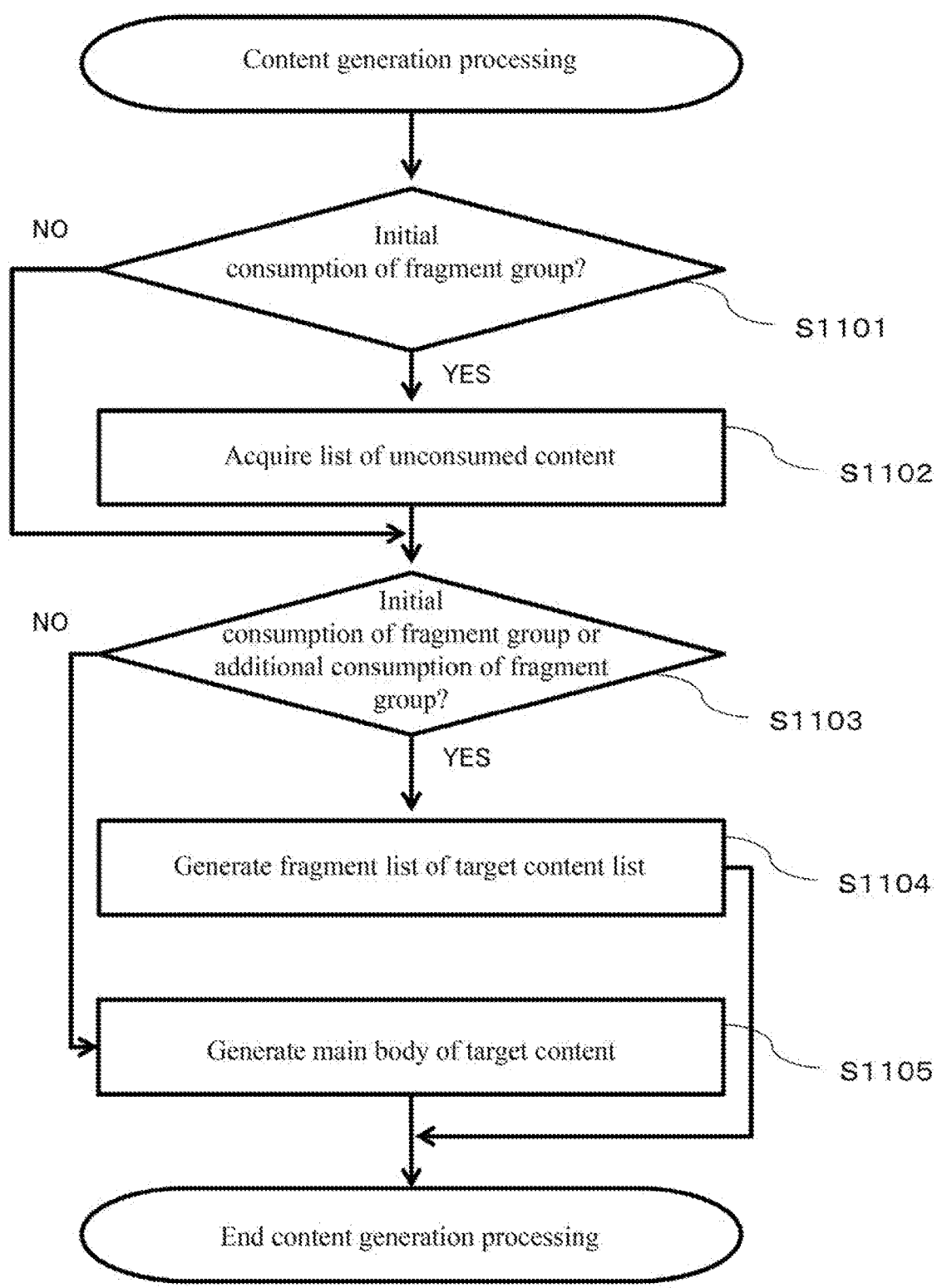
FIG. 11 is a flowchart illustrating an operating procedure of a content generating unit.

FIG. 11 is a flowchart illustrating an operating procedure of the process at Step 803 in FIG. 8. This process is performed by the content generating unit 51.

The content generating unit 51 first, when B is "Initial Consumption Requirement of Fragment Group" (S1101: YES), searches and acquires the content IDs that have not been consumed by A from the main body DB 11 using the consumption history DB 30 (S1102). They are held in C as the list of the content IDs. When B is not "Initial Consumption Requirement of Fragment Group" (S1101: NO), the process transitions to Step 1103, which is described later.

Next, at Step 1103, when B is "Initial Consumption Requirement of Fragment Group" or "Additional Consumption Requirement of Fragment Group" (S1103: YES), for each content ID of the information C, the content generating unit 51 searches "Fragment Information" records that have this content ID in the "Corresponding Content ID" field from the fragment DB 12, calculates "Priority" for each appropriate record, and acquires a record having the highest value of "Priority" (S1104). The acquired record group is held as content information D.

Otherwise, that is, when B is "Consumption Requirement of Main Body" (S1103: NO), the content generating unit 51 searches and acquires a "Main Body Information" record that has the content ID held by the information C in the "content ID" field (S1105). The acquired record is held as the content information D.

The process at Step 1102 has an upper limit. For example, when the upper limit is set to 10, the number of the content IDs acquired at Step 1102 is up to 10.

In the process at Step 1104, a concrete example of a calculation method of "Priority" in the "Fragment Information" record will be described. It is assumed that degree-of-demand information of the profile information of A regarding the category to which the content to which this fragment belongs belongs is set with "Degree of Demand for Conclusion" of 1, "Degree of Demand for Theme" of 2, "Degree of Demand for Location" of 3, and "Degree of Demand for Time" of 4. Additionally, it is assumed that attribute value information of this fragment is set with "Conclusion Attribute Value" of 5, "Theme Attribute Value" of 6, "Location Attribute Value" of 7, and "Time Attribute Value" of 8. At this time, "Priority" can be calculated as 70 from their multiplication ($1 \times 5 + 2 \times 6 + 3 \times 7 + 4 \times 8 = 70$).

The above-described process calculates "Priority" based on heuristics that "information having a high attribute value of an element having a high degree of demand of the consumer is information demanded by the consumer."

However, a specific procedure to calculate "Priority" is not limited to this. An already-publicly-known technique regarding information search and information recommendation may be used.

[User Interface Generation Processing]

Figure 12:
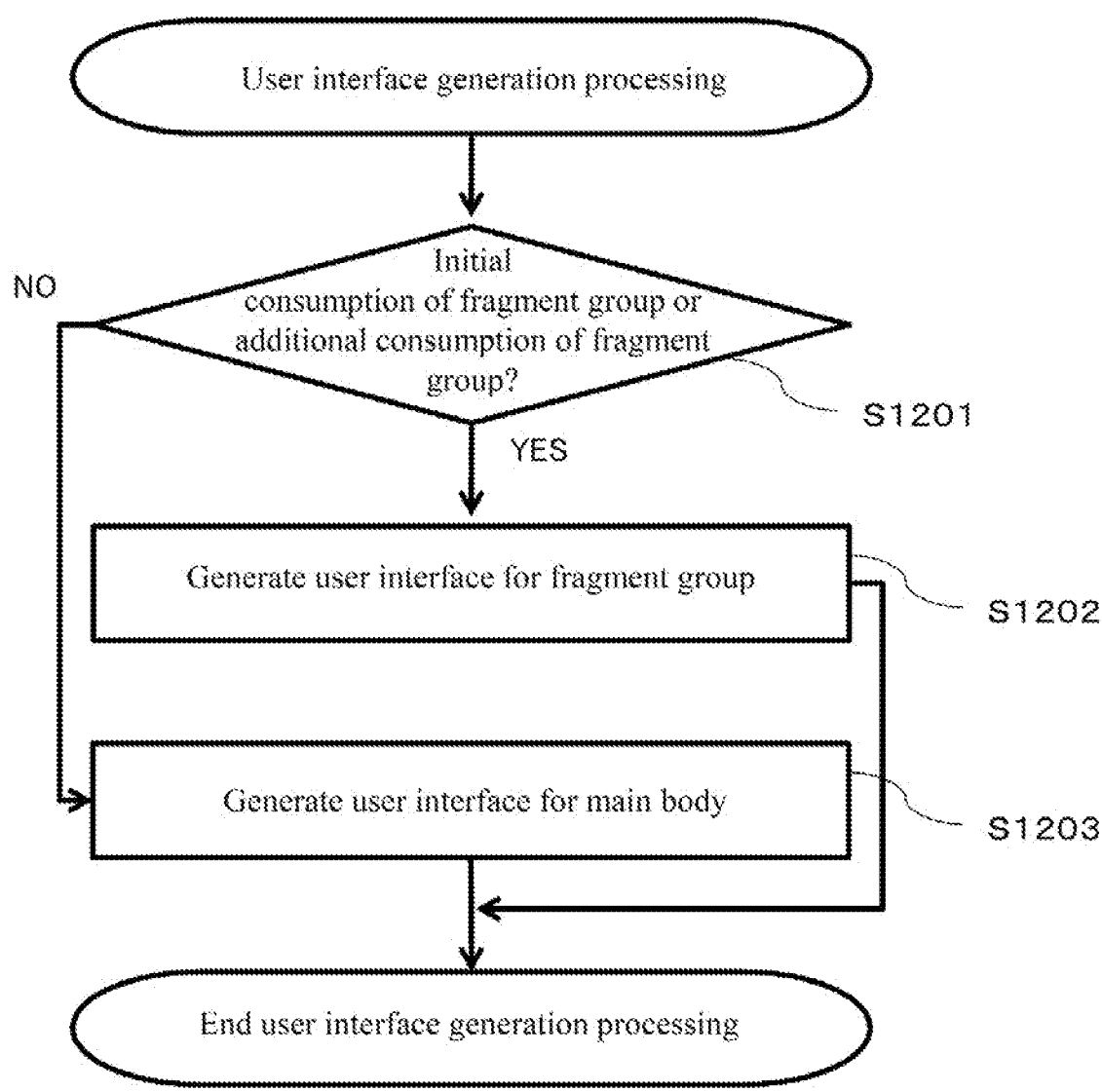
FIG. 12 is a flowchart illustrating an operating procedure of a user interface generating unit.

FIG. 12 is a flowchart illustrating an operating procedure of the process at Step 804 in FIG. 8. This process is performed by the user interface generating unit 50.

When B is "Initial Consumption Requirement of Fragment Group" or "Additional Consumption Requirement of Fragment Group" (S1201: YES), the user interface generating unit 50 generates a user interface having display areas of the respective "Fragment Information" records held by D and a choosing function of "consumption of a corresponding main body," and further, a choosing function of "additional consumption of the fragment group" with respect to the whole fragment group (S1202). The generated product is held as user interface information E.

When the consumer chooses the above-described "additional consumption of the fragment group," the user interface generating unit 50 holds "Additional Consumption of Fragment Group" in B, and generates a request to hold the content ID to which all fragments displayed by E belong in C. When the consumer chooses the above-described "consumption of a corresponding main body," the user interface generating unit 50 holds "Consumption Requirement of Main Body" in B, and generates a request to hold the content ID to which the chosen fragment displayed by the E belongs in C.

These requests are processed at above-described Step 808.

Otherwise, that is, when B is "Consumption Requirement of Main Body" (S1201: NO), the user interface generating unit 50 generates a user interface having a display area of the main body (S1203). The generated product is held as the user interface information E.

Figure 13A:
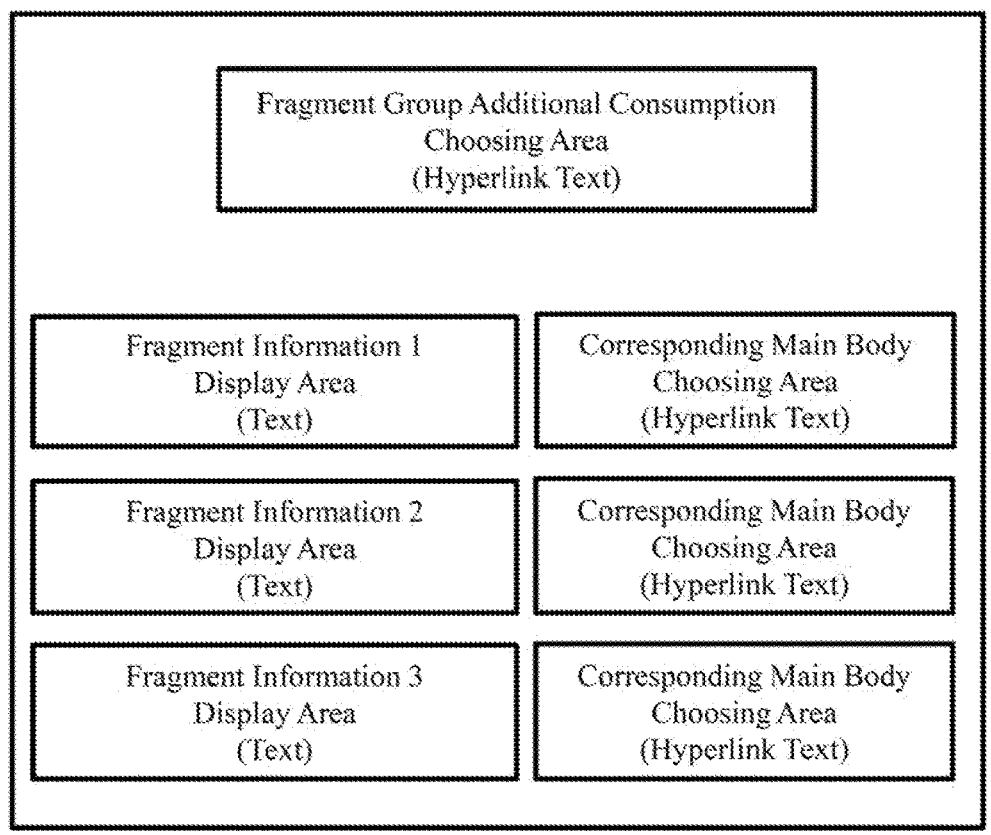
FIGS. 13A and 13B illustrate display examples of a user interface.
Figure 13B:
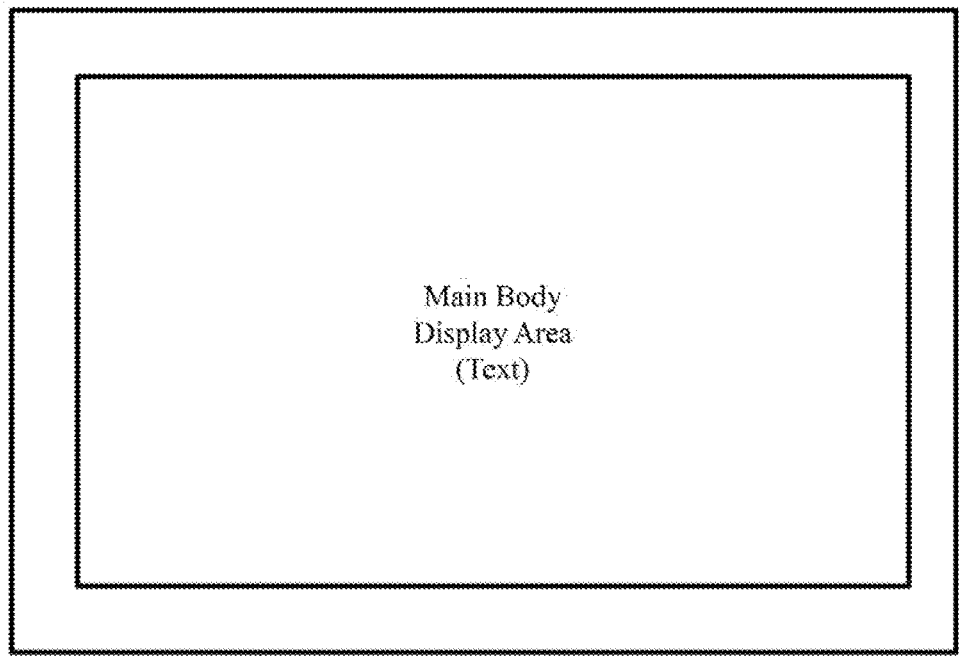

FIGS. 13A and 13B are display examples of the user interface information E. FIG. 13A is E generated at Step 1202, and FIG. 13B is E generated at Step 1203. In the embodiment, on the assumption that the manipulation is performed with the web browser, a choosing area is generated with a hyperlink text. In the display area, for example, a text and an image are displayed.

[Combination Processing]

Figure 14A:
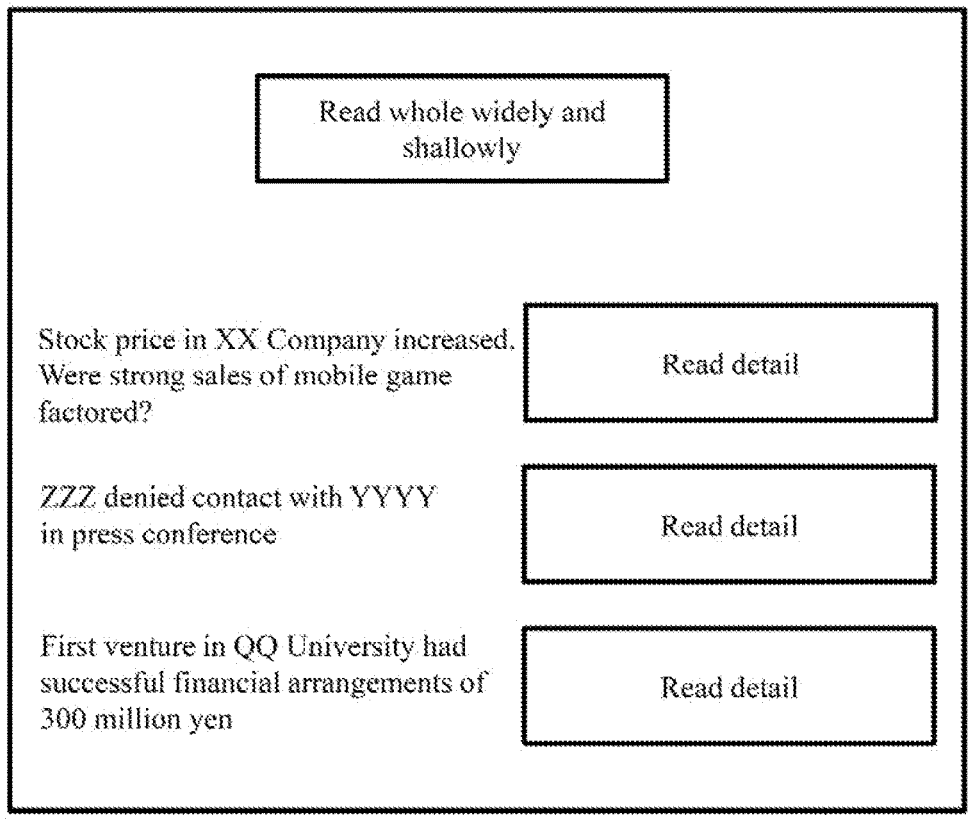
FIGS. 14A and 14B illustrate combined examples of content and the user interface.
Figure 14B:
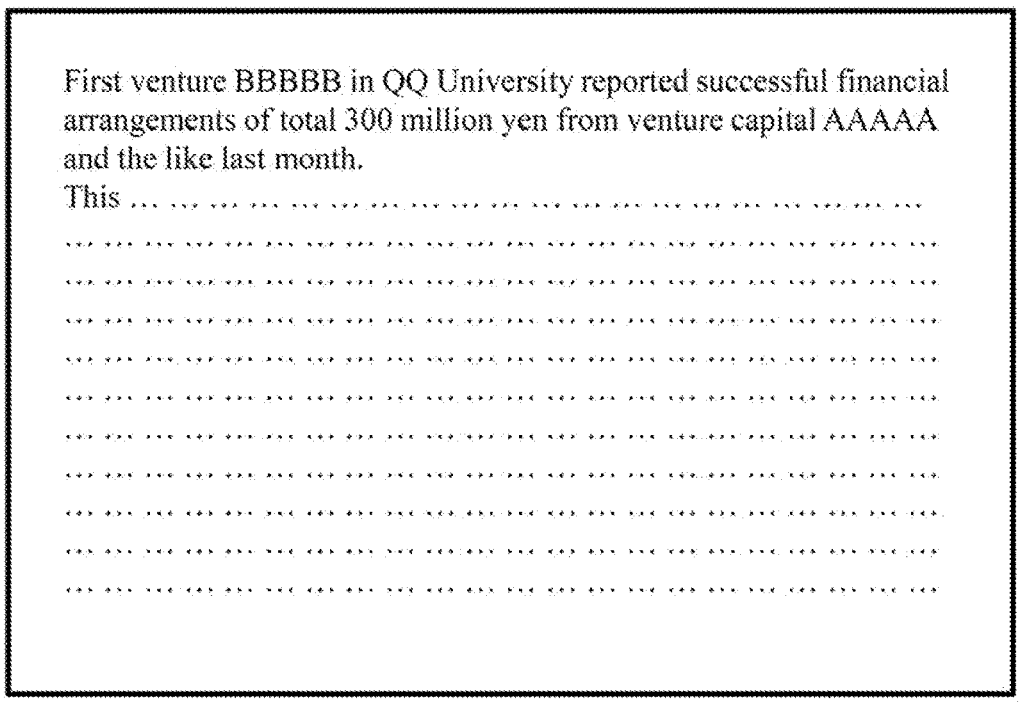

This process is performed by the content-and-user-interface combining unit 52. The combining unit 52 combines E with D. FIGS. 14A and 14B are display examples of a combination result. A combination result when B is "Initial Consumption Requirement of Fragment Group" or "Additional Consumption Requirement of Fragment Group" is illustrated in FIG. 14A. A combination result when B is "Consumption Requirement of Main Body" is illustrated in FIG. 14B. The combined product is held as combined product information F.

[Content Distribution Processing]

This process is performed by the content distribution unit 60. The content distribution unit 60 distributes F to A, generates a "Consumption History Information" record using D and A, and then, supplies it to the consumption history DB 30.

[Post-Processing]

Figure 15:
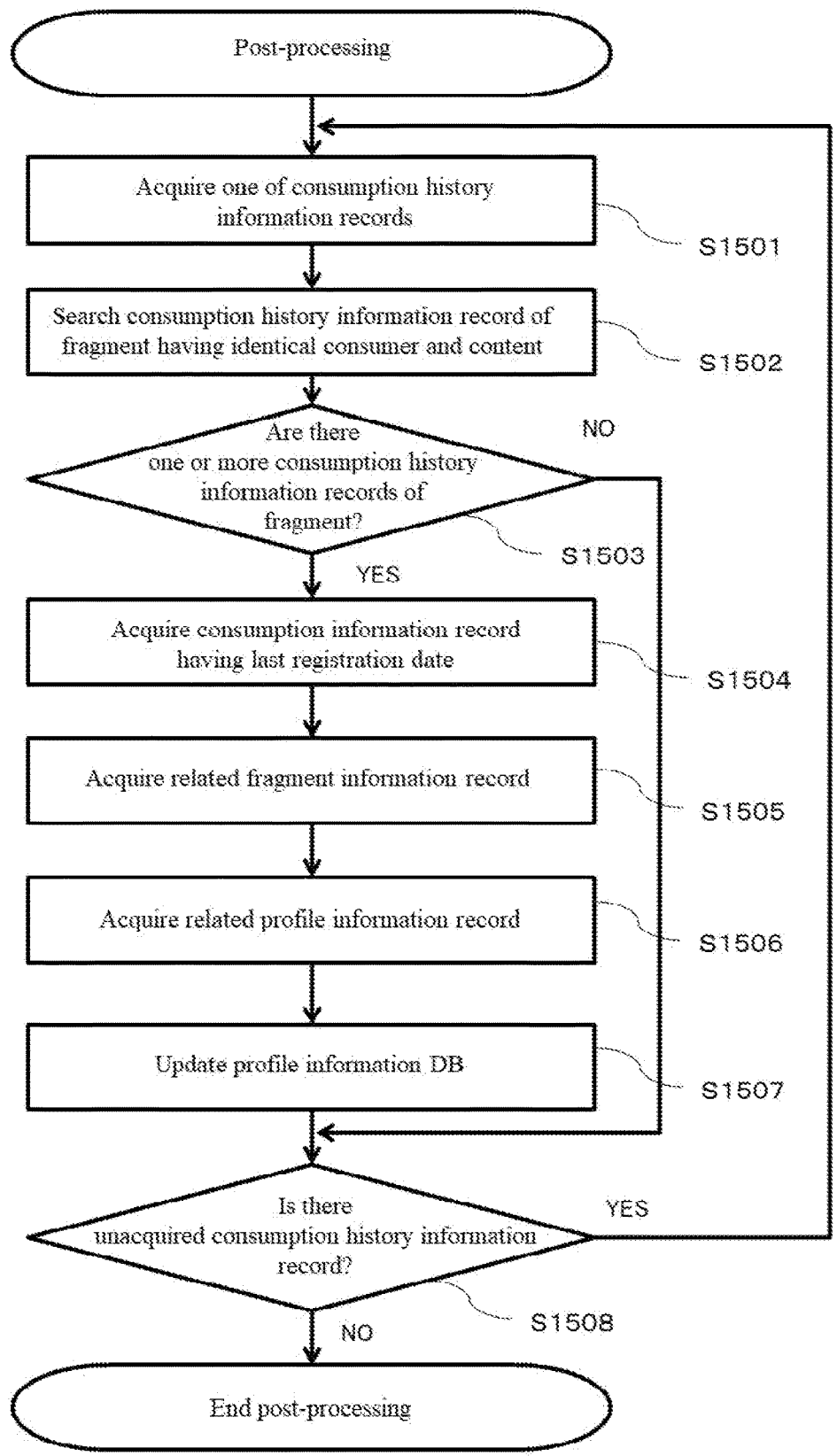
FIG. 15 is a flowchart illustrating an operating procedure of a profile information updater.

FIG. 15 is a flowchart illustrating an operating procedure of the process at Step 807 in FIG. 8. This process is performed by the profile information updater 80. A purpose of the post-processing is to automatically learn the desire of the consumer from the history of the consumption behavior of the consumer to update the profile information.

The profile information updater 80 acquires one of the "consumption history information" records from the consumption history DB 30 (S1501). Next, the profile information updater 80 searches all the "Consumption History Information" records matching up in the "Corresponding Content ID" field and the "Corresponding Consumer ID" field with this one record and having "Fragment" in the "Consumption Type" field from the consumption history DB 30 (S1502). When there are one or more "Consumption History Information" record groups (S1503: YES), the profile information updater 80 acquires a "Consumption History Information" record having the newest "Registration Date" field from this "Consumption History Information" record group (S1504). When there is no "Consumption History Information" record groups (S1503: NO), the process transitions to Step 1508, which is described later.

The above-described processes at Steps 1502, 1503, and 1504 specify what the last consumed fragment was when a certain consumer has consumed certain content.

Next, the profile information updater 80 searches and acquires a "Fragment Information" record having the "Corresponding Fragment ID" field of this "Consumption History Information" record in the "Fragment ID" field from the fragment DB 12 (S1505).

Simultaneously, the profile information updater 80 searches and acquires a "Profile Information" record having the "Corresponding Category" field and the "Corresponding Consumer ID" field of this "Consumption History Information" record in the "Corresponding Category" field and the "Corresponding Consumer ID" field from the profile information DB 21 (S1506).

The above-described processes at Steps 1505 and 1506 acquire what sort of attribute value information the last consumed fragment holds when a certain consumer has consumed certain content, and acquire what sort of degree-of-demand information this consumer holds for the category to which this content belongs.

Then, the profile information updater 80 overwrites the "Degree of Demand for Conclusion," "Degree of Demand for Theme," "Degree of Demand for Location," and "Degree of Demand for Time" fields of this "Profile Information" record with "Conclusion Attribute Value," "Theme Attribute Value," "Location Attribute Value," and "Time Attribute Value" of this "Fragment Information" record respectively to supply it to the profile information DB 21 (S1507). Next, the profile information updater 80 confirms whether there is an unacquired consumption history information record at Step 1508. When there is the unacquired consumption history information record (S1508: YES), the process returns to Step 1501. When there is no unacquired consumption history information record (S1508: NO), the process is ended.

The above-described post-processing updates the profile information DB 21 based on heuristics that "the fragment last consumed by the consumer holds the information most demanded by the consumer for that content."

However, the heuristics used in the process at Step 807 and the specific procedure to update the profile information are not limited to this. An already-publicly-known technique regarding machine learning and statistics may be used.

As described above, the embodiment of the present invention has been described. However, they are only one example, and the technical scope of the present invention is not limited to them.

For example, the attribute information of the fragment DB 12 and the degree-of-demand information of the profile information DB 21 may be held in a format different from that of the embodiment. A publicly known existing technique may be used at Steps 807, 902, 905, and 1104. The communication between the consumer 2 and the distribution device 1 is not necessarily constantly performed via the network 3. The distribution device 1 itself may be provided to the browser of the consumer 2 in a form of an executable program with the browser in the initial communication, and after that, all the processes may be executed with the browser.

The user interface of the choosing area in FIG. 13A is not necessarily the hyperlink text. A user interface that performs choosing manipulation with, for example, tap operation of a smart phone, drag of a scroll bar, and mouseover is also possible. The range of the content group additionally consumed is not necessarily identical to that of the content group distributed last time. The user interface that chooses the additional consumption may have a function to limit the range of the content group to be consumed as well, and a range different from a range consumed last time may be additionally consumed.

DESCRIPTION OF REFERENCE SIGNS

1: Content group distribution device
2: Consumer terminal
3: Network
10: Content DB
11: Main body DB
12: Fragment DB
20: Consumer information DB
21: Profile information DB
22: Consumer DB
30: Consumption history DB
40: Request receiving unit
50: User interface generating unit
51: Content generating unit
52: Content-and-user-interface combining unit
60: Content distribution unit
70: Fragment generating unit
80: Profile information updater

The invention claimed is:

1. A distribution method for a plurality of contents with computer software, comprising:
- a step of generating content fragments from each of the plurality of contents;
- a step of generating a content fragment group which is comprised of the content fragments generated from the plurality of contents;
- a step of generating a first user interface operated for providing a corresponding main body for each of the content fragments of the content fragment group;
- a step of generating a second user interface operated for changing the content fragments with other content fragments generated from the same contents for the plurality of contents;
- a step of combining the first user interface and the second user interface with the content fragment group; and
- a step of providing the corresponding main body responding to an operation of the first user interface or changing the content fragments with the other content fragments responding to an operation of the second user interface, wherein the step of generating content fragments from each of the plurality of contents has a feature that allows one content to hold three or more content fragments, further, the step of combining the first user interface and the second user interface with the content fragment group and the step of providing the corresponding main body responding to an operation of the first user interface or changing the content fragments with other content fragments responding to an operation of the second user interface allow a user to repeat an action to obtain the plurality of contents with an amount more than the provided content fragments and less than the main body two or more times by combining a new content fragment group which is comprised of the other content fragments with the first user interface and the second user interface again, and further, the first user interface and the second user interface limit a count of options of obtaining the contents to one more than a total count of the contents.

2. The distribution method for the plurality of contents according to claim 1, further comprising
- a step of storing profile information regarding a content consumption per user, wherein
- the step of generating a content fragment group and the step of changing the content fragments with the other content fragments are executed using the profile information.

3. The distribution method for the plurality of contents according to claim 2, wherein
- the step of storing profile information automatically determines and updates the information based on a past history of obtaining the plurality of contents obtained by the user.

* * * * *